United States Patent Office 3,268,608
Patented August 23, 1966

3,268,608
SELECTIVE HYDROGENATION PROCESS
Armand J. De Rosset, Clarendon Hills, Ill., assignor to Universal Oil Products Company, Des Plaines, Ill., a corporation of Delaware
No Drawing. Filed Dec. 26, 1963, Ser. No. 333,646
9 Claims. (Cl. 260—668)

This invention relates to a process for the selective hydrogenation of certain aromatic compounds in the presence of a treated hydrogenation catalyst. More specifically, the invention is concerned with a process for the selective hydrogenation of an aromatic compound containing an unsaturated side chain substituent in the presence of a pretreated hydrogenation catalyst.

Certain alkyl substituted aromatic compounds will find a wide variety of uses in the chemical field. For example, ethylbenzene may be utilized as an intermediate in organic syntheses for the preparation of other useful compounds and in addition may also be used as a solvent or diluent. Cumene (isopropylbenzene) is also a useful compound in the chemical field, one use being as a starting material in an oxidation process whereby acetone and acetophenone are prepared by a series of steps, the latter two compounds having a wide variety of uses as intermediates, solvents, etc.

It is therefore an object of this invention to provide a process for the selective hydrogenation of aromatic compounds containing an unsaturated side chain in the presence of a treated hydrogenation catalyst.

A further object of this invention is to provide a process whereby the unsaturated side chain of an alkenyl substituted aromatic compound will be selectively hydrogenated in the presence of a certain treated catalyst.

Taken in its broadest aspect, one embodiment of this invention resides in a process for the selective hydrogenation of an alkenyl substituted aromatic compound which comprises treating said compound with hydrogen in the presence of a sulfided hydrogenation catalyst at hydrogenation conditions, and recovering the desired product.

A further embodiment of this invention is found in a process for the selective hydrogenation of an alkenyl substituted aromatic compound which comprises treating said compound with hydrogen in the presence of a catalyst comprising sulfided nickel composited on a solid support at a temperature in the range of from about 100° to about 300° C. and at a pressure in the range of from about 2 to about 100 atmospheres.

Yet another embodiment of this invention is found in a process for the selective hydrogenation of alpha-methylstyrene which comprises treating said alpha-methylstyrene with hydrogen in the presence of a sulfided hydrogenation catalyst at a temperature in the range of from about 100° to about 300° C. and at a pressure in the range of from about 2 to about 100 atmospheres.

A specific embodiment of this invention resides in a process for the selective hydrogenation of styrene which comprises treating said styrene with hydrogen in the presence of a catalyst comprising sulfided nickel composited on alumina at a temperature in the range of from about 175° to about 225° C. and at a pressure in the range of from about 20 to about 35 atmospheres, and recovering the desired ethylbenzene.

Other objects and embodiments will be found in the following further detailed description of this invention.

It has now been discovered that a selective hydrogenation process may be effected whereby an aromatic compound containing an unsaturated side chain substituent may be treated with hydrogen in the presence of a certain catalytic composition of matter with the result that the unsaturated side chain substituent is hydrogenated to become an alkyl substituent while the aromatic ring does not undergo hydrogenation but retains its aromatic character. Alkenyl substituted aromatic compounds and preferably hydrocarbons which contain only carbon and hydrogen atoms, in which the alkenyl substituent contains from 2 up to about 12 carbon atoms or more, which may undergo the selective hydrogenation of the present process include styrene, alpha-methylstyrene, crotonyl benzene, 1-pentene benzene, 2-pentene benzene, 3-pentene benzene, 4-pentene benzene, 1-hexene benzene, 2-hexene benzene, 3-hexene benzene, 4-hexene benzene, 5-hexene benzene, the isomeric heptene, octene, nonene, decene, undecene, dodecene benzenes, etc. It is also contemplated within the scope of this invention that the alkylene substituent may contain a branched chain configuration as well as a straight chain configuration and also that said chain may also contain diolefinic unsaturation.

The process of this invention is effected at hydrogenation conditions which include a temperature in the range of from about 100° to about 300° C. and a pressure in the range of from about 2 to about 100 atmospheres, the pressure being sufficient to maintain a major portion of the reactants in the liquid phase. The catalysts which are utilized for this invention comprise hydrogenation catalysts including metals of the platinum group of Group VIII of the Periodic Table including platinum, palladium, osmium, iridium, ruthenium, rhodium and also nickel, said metals being used either per se or composited on a solid non-siliceous solid support which does not contain excessive quantities of acidic-acting components. In general, the platinum group component or nickel will be utilized in a concentration of from about 0.01% up to about 5% or more by weight of the final catalyst. In addition it is also contemplated within the scope of this invention that when the hydrogenation catalyst comprises a platinum group or nickel composited on a solid support such as charcoal or alumina, etc., an alkali metal or alkaline earth metal component such as cesium, lithium, rubidium, sodium, calcium, magnesium and/or strontium may also be employed in a concentration of not more than about 5.0% by weight of the catalyst, the preferable range being from about 0.01% to about 0.7% by weight calculated as the element itself.

The hydrogenation catalysts may be prepared in any suitable manner, and it is to be understood that the particular method of manufacture is neither essential to, nor limiting upon the present invention. For example, when a hydrogenation catalyst in which the metallic component comprises nickel, platinum or palladium is composited on a solid support one method which may be employed comprises preparing alumina by reacting a suitable alkaline reagent including ammonium hydroxide, ammonium carbonate, etc. with a salt of aluminum chloride, aluminum sulfide, aluminum nitrate, etc., the substances being intimatly admixed under conditions to form aluminum hydroxide which, upon subsequent heating and drying, will form alumina. The platinum-group metallic component or nickel and, if so desired, the alkali metal or alkaline earth metal component, are addd by way of impregnating techniques utilizing aqueous solutions of these metals. It is generally advisable to introduce the platinum-group metallic component or nickel at a latter step of the catalyst preparation in order that this relatively expensive metallic component will not be lost in subsequent processing. Following this the catalyst is generally dried at a temperature of about 200° F. followed by a calcination treatmnt at a temperature of from about 800° F. to about 1100° F. for a period of from about 2 to about 12 hours, and in an atmosphere of air.

The catalysts are pretreated before being used in the process of this invention, said pretreating comprising being subjected to sulfiding. The presulfiding of the catalyst is usually accomplished by treating the predetermined catalyst which may be in various physical forms such as spheres, pills, pellets, etc., with hydrogen sulfide in a hydrogen stream at elevated temperatures ranging from about 250° to about 350° C. for a period of time ranging from about 1 to about 4 hours or more. The presulfided catalyst will usually contain from about 10 to about 25% sulfur on the finished catalyst although catalysts containing a lesser amount or a greater amount of sulfur may also be utilized.

In the preferred embodiment of the invention the alkenyl substituted aromatic compound of the type hereinbefore set forth in greater detail is subjected to the selective hydrogenation reaction of the present invention in the presence of an alkyl substituted aromatic hydrocarbon although the presence of the alkyl aromatic compound is not an absolute necessity.

The process of the present invention may be effected in any suitable manner and may comprise either a batch or continuous type operation. For example, when a batch type operation is used, a quantity of the alkenyl substituted aromatic compound is charged to an appropriate apparatus such as a rotating autoclave which contains the presulfided hydrogenation catalyst. The autoclave is sealed and hydrogen pressed in until the desired pressure has been reached. The autoclave is then heated to the reaction temperatures and maintained thereat for a predetermined period of time. At the end of this time the autoclave and contents thereof are allowed to cool to room temperature, the excess pressure is vented and the desired product is recovered by conventional means such as fractional distillation, etc.

The process of the present invention may also be effected in a continuous type operation. In this type of procedure the alkenyl substituted aromatic compound either alone or in the presence of an alkyl substituted aromatic compound is continuously charged to a reaction zone containing a presulfided hydrogenation catalyst and which is maintained at the proper operating conditions of temperature and pressure. Hydrogen is also continuously pressed in and after a predetermind residenc time the desired product is continuously withdrawn from the reaction zone. The reactor effluent is separated and the desired product comprising the alkyl substituted aromatic compound is separated from any unreacted starting material, the latter being recycled to form a portion of the feed stock while the former is recovered by conventional means.

It is also contemplated within the scope of this invention that when utilizing certain of the presulfided hydrogenation catalysts such as a nickel on alumina catalyst, that the feed stream contain a relatively small amount of sulfur to prevent the catalyst from becoming nonselective in its hydrogenation activity. Therefore, when utilizing a hydrogenation catalyst containing nickel it is preferable that the hydrogen stream contain a relatively small amount of sulfur preferably in the form of hydrogen sulfide in the order of from about 35 to about 70 parts per million of hydrogen sulfide per part of hydrogen.

Examples of alkyl substituted aromatic compounds which may be prepared from the alkenyl substituted aromatic compounds according to the process of this invention include ethylbenzene, n-propylbenzene, cumene (isopropylbenzne), n-butylbenzene, t-butylbenzene, the isomeric pentyl, hexyl, heptyl, octyl, nonyl, decyl, undecyl, dodecyl benzenes, etc.; alkyl substituted polycyclic aromatic compounds such as 1-ethylnaphthalene, 2-ethylnaphthalene, 1-n-propylnaphthalene, 1-isopropylnaphthalene, 2-butylnaphthalene, the isomeric ethyl, propyl, butyl, pentyl, hexyl, etc. crysenes, anthracenes, etc.

The following examples are given to illustrate the process of the present invention which, however, are not intended to limit the generally broad scope of the present invention in strict accordance therewith.

*Example I*

In this example a hydrogenation catalyst comprising nickel composited on alumina was sulfided prior to its use as a selective hydrogenation catalyst by placing 100 cc. of the catalyst in a reaction vessel and treating the catalyst with a hydrogen sulfide-hydrogen mixture containing 22% hydrogen sulfide at a temperature ranging from about 280° to about 330° C. for a period of three hours, the hydrogen stream being charged to the reaction vessel at a rate of about 0.75 cubic feet per hour. At the end of this time the catalyst was recovered and by analysis found to contain 10.85% sulfur on the finished catalyst.

A 100 gram sample of a styrene-ethylbenzene mixture containing 90.5% ethylbenzene and 9.5% styrene, said mixture having a bromine index of 13,000 was placed in a glass liner of a rotating autoclave, said liner also containing 10 grams of a catalyst prepared according to the above paragraph. The autoclave was sealed and hydrogen pressed in until a pressure of about 20 atmospheres had been reached. The autoclave and contents thereof were then heated to a temperature of about 200° C. and maintained thereat for a period of 2 hours, the pressure during this time rising to about 34 atmospheres. At the end of this time the autoclave and contents thereof were allowed to cool to room temperature, the excess pressure was vented and the reaction product recovered. Analysis of the product disclosed the presence of 99.9% ethylbenzene and 0.1% ethylcyclohexane, the product then having a bromine index of only 4.

*Example II*

In this example a nickel-alumina hydrogenation catalyst in pill form was treated in a manner similar to that set forth in Example I above, that is, by placing said catalyst in a reaction vessel and charging a hydrogen sulfide-hydrogen stream thereto. In this example the hydrogen sulfide-hydrogen stream contained 30% hydrogen sulfide, the catalyst being treated at a temperature of from about 300° to about 315° C. for a period of 2 hours, the hydrogen being charged at a rate of about 0.57 cubic feet per hour. Upon completion of the presulfiding treatment the catalyst was found to contain 23.5% sulfur on the finished catalyst.

A 100 gram sample of a styrene-ethylbenzene mixture which contained 90.5% ethylbenzene and 9.5% styrene was placed in the glass liner of a rotating autoclave which contained 10 grams of a catalyst prepared according to the above paragraph. The autoclave was sealed and hydrogen pressed in until a pressure of approximately 21 atmospheres had been reached. The autoclave and contents thereof were then heated to a temperature of about 200° C. and maintained thereat for a period of about 2 hours. The maximum pressure during this time reached about 33 atmospheres. At the end of the 2 hour time the autoclave and contents thereof were cooled to room temperature, the excess pressure was vented and the reaction product recovered. The product was subjected to analysis and found to contain 99.9% ethylbenzene with only a trace of ethylcyclohexane, said product having a bromine index of only 53.

*Example III*

In this example a hydrogenation catalyst which was utilized comprised 0.05% palladium on alumina. The catalyst was treated by presulfiding in a manner similar to that hereinbefore set forth. Again 100 grams of an ethylbenzene-styrene mixture containing 90.5% ethylbenzene and 9.5% styrene was charged to the glass liner of a rotating auotclave which contained 10 grams of the presulfided hydrogenation catalyst. The autoclave was sealed and hydrogen pressed in until a pressure of approximately 10 atmospheres had been reached. The autoclave was then heated to a temperature of about 130° C. and maintained thereat for a period of 1 hour, the major pressure during this time reaching about 15 atmospheres. At the end of this time the autoclave and contents thereof were then cooled to room temperature, the excess pressure was vented and the reaction product recovered. The product contained 99.9% ethylbenzene with a trace of ethylcyclohexane and a trace of styrene being present, said reaction product having a bromine index of 104.

*Example IV*

In this example a nickel-alumina catalyst was sulfided by treating a 100 cc. (64.2 grams) load of catalyst with hydrogen sulfide in a reaction apparatus at room temperature and a pressure of about 3.5 atmospheres.

A reaction apparatus was cleaned and dried with nitrogen to insure that the apparatus was completely free of contaminants. The reactor was then loaded with 100 cc. of the catalyst which had been presulfided and in addition t-butyl mercaptan was added to the charge stock to give 10 weight parts per million of sulfur, thereby insuring the presence of hydrogen sulfide in the apparatus and preventing the catalyst from acting in a non-selective fashion.

A blend of 92 weight percent of cumene and 8 weight percent of alpha-methylstyrene was charged to the apparatus, said apparatus being maintained at a temperature of about 205° C. and a pressure of about 50 atmospheres of hydrogen. Upon completion of the desired residence time the reactor and contents were allowed to cool to room temperature, the excess pressure was vented and the product recovered. The product was found to contain 98.74 weight percent of cumene and 0.02 weight percent of alpha-methylstyrene along with 1.24% of heavier boiling material.

*Example V*

In this example a catalyst comprising 0.05% of palladium composited on alumina is presulfided by treating with a hydrogen sulfide-hydrogen stream at a temperature of about 300° C. for a period of about 2 hours. At the end of this time the sulfided catalyst is recovered.

A charge comprising 100 cc. of crotonylbenzene is placed in a rotating autoclave along with 10 grams of catalyst prepared according to the above paragraph. The autoclave is sealed and hydrogen pressed in until a pressure of approximately 20 atmospheres is reached. The temperature of the autoclave is raised to approximately 200° C. and maintained thereat for a period of about 2 hours. At the end of this the autoclave and contents thereof are cooled to room temperature, the excess pressure is vented and the reaction product comprising n-butylbenzene is recovered.

*Example VI*

In this example a hydrogenation catalyst comprising palladium composited on alumina is treated in a manner similar to that hereinbefore set forth, that is, by the addition of a hydrogen sulfide-hydrogen stream to said catalyst at an elevated temperature and pressure. The presulfided catalyst is then placed in an autoclave along with 100 grams of allylbenzene. The autoclave is sealed and hydrogen pressed in until a temperature of about 200° C. is reached. The autoclave and contents thereof are maintained at this temperature for a period of about 2 hours after which the said autoclave and contents are allowed to cool to room temperature. The excess pressure is vented, the autoclave is opened and the desired product comprising n-propylbenzene is recovered.

*Example VII*

A catalyst comprising 0.05% of palladium composited on alumina is presulfided by treating the hydrogen sulfide-hydrogen stream at a temperature of about 300° C. for a period of about 2 hours, the hydrogen sulfide-hydrogen stream containing 22% hydrogen sulfide.

A charge comprising a cumene-alpha-methylstyrene mixture which contains about 90% cumene and 10% alpha-methylstyrene is placed in the glass liner of a rotating autoclave which contains 10 grams of the catalyst prepared according to the above paragraph. The autoclave is sealed and hydrogen pressed in until a pressure of approximately 20 atmospheres is reached. The autoclave and contents thereof are then heated to a temperature of about 200° C. and maintained thereat for a period of about 2 hours. At the end of the residence time the autoclave and contents thereof are cooled to room temperature, the excess pressure is vented and the reaction product is recovered. This reaction product will be found to contain over 99% cumene.

I claim as my invention:

1. A process for the selective hydrogenation of the alkenyl group of an alkenyl substituted aromatic compound which comprises treating said compound with hydrogen containing a small amount of hydrogen sulfide in the presence of a sulfided hydrogenation catalyst at a temperature in the range of from about 100° to about 300° C. and at a pressure in the range of from about 2 to about 100 atmospheres, and recovering the desired product.

2. A process for the selective hydrogenation of the alkenyl group of an alkenyl substituted aromatic compound which comprises treating said compound with hydrogen containing a small amount of hydrogen sulfide in the presence of a catalyst comprising sulfided palladium composited on a solid support at a temperature in the range of from about 100° to about 300° C. and at a pressure in the range of from about 2 to about 100 atmospheres, and recovering the desired product.

3. A process for the selective hydrogenation of the alkenyl group of an alkenyl substituted aromatic compound which comprises treating said compound with hydrogen containing a small amount of hydrogen sulfide in the presence of a catalyst comprising sulfided platinum composited on a solid support at a temperature in the range of from about 100° to about 300° C. and at a pressure in the range of from about 2 to about 100 atmospheres, and recovering the desired product.

4. A process for the selective hydrogenation of the alkenyl group of an alkenyl substituted aromatic compound which comprises treating said compound with hydrogen containing a small amount of hydrogen sulfide in the presence of a catalyst comprising sulfided nickel composited on a solid support at a temperature in the range of from about 100° to about 300° C. and at a pressure in the range of from about 2 to about 100 atmospheres, and recovering the desired product.

5. A process for the selective hydrogenation of styrene which comprises treating said styrene with hydrogen containing a small amount of hydrogen sulfide in the presence of a catalyst comprising sulfided nickel composited on alumina at a temperature in the range of from about 175° to about 225° C. and at a pressure in the range of from about 20 to about 35 atmospheres, and recovering the desired ethylbenzene.

6. A process for the selective hydrogenation of styrene which comprises treating said styrene with hydrogen containing a small amount of hydrogen sulfide in the presence of a catalyst comprising sulfided palladium composited on alumina at a temperature in the range of from about 175° to about 225° C. and at a pressure in the range of from about 20 to about 35 atmospheres, and recovering the desired ethylbenzene.

7. A process for the selective hydrogenation of alpha-methylstyrene which comprises treating said alpha-methylstyrene with hydrogen containing a small amount of hydrogen sulfide in the presence of a catalyst comprising sulfided palladium composited on alumina at a temperature in the range of from about 175° to about 225° C. and at a pressure in the range of from about 20 to about 35 atmospheres, and recovering the desired isopropylbenzene.

8. A process for the selective hydrogenation of allylbenzene which comprises treating said allylbenzene with hydrogen containing a small amount of hydrogen sulfide in the presence of a catalyst comprising sulfided palladium composited on alumina at a temperature in the range of from about 175° to about 225° C. and at a pressure in the range of from about 20 to about 35 atmospheres, and recovering the desired n-propylbenzene.

9. A process for the selective hydrogenation of crotonylbenzene which comprises treating said crotonylbenzene with hydrogen containing a small amount of hydrogen sulfide in the presence of a catalyst comprising sulfided palladium composited on alumina at a temperature in the range of from about 175° to about 225° C. and at a pressure in the range of from about 20 to about 35 atmospheres, and recovering the desired n-butylbenzene.

References Cited by the Examiner
UNITED STATES PATENTS

| | | | |
|---|---|---|---|
| 2,497,176 | 2/1950 | Mason | 260—683.9 |
| 2,793,238 | 5/1957 | Banes et al. | 260—666 |

OTHER REFERENCES

Zartman et al.: "The Variations in the Behavior of Phenylethenes and Ethanes During Catalytic Hydrogenation," J.A.C.S., April 1932, vol. 54, p. 1668.

DELBERT E. GANTZ, *Primary Examiner.*

S. P. JONES, *Assistant Examiner.*